United States Patent Office 2,720,004
Patented Oct. 11, 1955

2,720,004

PROCESS OF CURING A POLYESTER RESIN IN A RUBBER MOLD

Ellis H. Phreaner, Los Angeles, Calif., assignor of one-third to H. Calvin White, Pasadena, Calif.

No Drawing. Application October 16, 1950,
Serial No. 190,442

5 Claims. (Cl. 18—55)

This invention has to do with improvements in molding or forming parts for use in the shaping or molding of resinous plastic members, and to molding procedures representing distinct advances in the art by reason of the uninhibited thermal curability of the resin and the free separability of the contacting mold and resin surfaces.

More particularly the invention is directed to the use of mold parts having resin-contacting rubber surfaces, and to the solution of the problems of preventing inhibition of the resin cure in the presence of the contacting rubber, and assuring completely free and clean separation of the rubber mold face from the formed resin surface.

Before proceeding to a particularized description of the mold parts and their use, it is desired to indicate the nature, form and composition of certain of the materials with which the invention is concerned.

First, it is contemplated that the plastic resin shaping part may be of any form suitable for the purpose of the particular molding operation at hand. Customarily, these plastic resins are shaped into objects of various forms by the use of molds having complementary parts such as male and female sections, either or both of which may be made of rubber, or surfaced with rubber at the resin-contacting face, especially where it is desired to obviate the necessity for having to make all-metal molds. A current practice is to form resinous plastics in molds having metal female sections and rubber or rubber-faced male or plug sections. Also used are so-called pads, membranes or blankets which are given pressure application directly to the resinous plastic during its thermal setting, and which serve therefore essentially as molding elements in that they contact a surface of the plastic material and determine the shape of that surface. Accordingly, as herein used the term "mold part" shall be understood to be inclusive of male or female mold sections, and flexible pads, membranes and blankets.

The objects of the invention are accomplished by the use of any of various synthetic rubbers and particularly of the following class: polychloroprene polymers, butadiene-acrylonitrile copolymers, butadiene-styrene copolymers, and chlorinated copolymers of butadiene and acrylonitrile. As will appear, these synthetic rubbers when prepared and used in accordance with the invention display the physical properties and durability desired in a high grade mold part, and can be given in relation to the contacting resin those qualities permitting efficient curing or setting of the resin, and complete final separation of the rubber and resin.

As to the resins, the invention is not primarily concerned with their composition beyond the generalities of resins which normally are inhibited in their cure by any ordinary contacting rubber, and which tend after setting, to so adhere to the rubber molding surface as to prevent perfectly clean separation. The resins may be further characterized as those which require oxidation or the presence in their composition of an oxidizing catalyst, for proper setting or curing, and which ordinarily are inhibited in their setting by contact with a non-oxidizing or oxidation-inhibited rubber. Typical of such resins are the widely used polyester resins or alkyd resins, some of which are modified as with dialkyl phthalate or styrene, and the vinyl resins. (Commercial polyester resins are Libby-Owens-Ford Glass Co. "Plaskon" resins, Pittsburgh Plate Glass Co. "Selectron" resins, and U. S. Rubber Co. "Vibrin" resins.) Depending upon the purpose for which the molded part is to be used, these resins frequently are molded with various forms of reenforcements (sometimes laminates) such as solid inserts, fillers and fiber glass particles or weaves such as woven sheets. As herein used, the term "resinous plastic" will be understood to mean a thermal setting resinous material of the character indicated.

Experience has shown that attempts to use mold parts made or surfaced with rubbers in the class designated, have resulted in the two major difficulties to which I have referred. That is to say, the rubber contacted surface of the resinous plastic is inhibited in its cure and therefore does not acquire a satisfactory set, and adherence between the rubber and plastic occurs at their contacting surfaces to a degree objectionable from standpoints of both the mold and resin surfaces. This condition of inhibited curing of the plastic appears to result from the preventing or arresting of the progressive oxidation, or oxidizing catalyst action, that must continue during thermal setting of the resin, this inhibition in turn being due to the presence in the rubber of the customary anti-oxidizing agents which under the circumstances inhibit not only oxidation of the rubber beyond a certain degree, but inhibit also chemical or catalytic oxidation of the resin to the degree required for satisfactory setting.

In accordance with the invention, the mold member is made or faced with any of the abovementioned synthetic rubbers characterized particularly in that the rubber has an oxidizing potential, i. e. it contains one or more oxidizing or oxygen-bearing compounds which impart to the rubber an oxdizing property or quality, in contrast to such rubbers as are usually compounded with antioxidants (such as phenyl-beta-naphthylamine, polymerized trimethyl dihydroquinoline, antiquinone mono benzyl ether, and adol-alpha-naphthylamine) ordinarily used to arrest or prevent oxidation of the rubber. Any of various oxidizing agents or compounds may be incorporated in the rubber to give it the desired oxidizing potential. Preferred, though typical, are any of various peroxides, as for example, benzoyl peroxide (compounded for example with tricrysyl phosphate), 2-4 dichlorobenzoyl peroxide, p-chlorobenzoyl peroxide, t-butyl perphthalic acid, methyliso-butyl ketone peroxide, methyl amyl ketone peroxide and cumene hydroperoxide. Of these oxidizing agents, benzoyl peroxide may be regarded as preferred. Milder oxidizing agents may be used, but ordinarily larger quantities thereof would be required.

The addition of the required amounts of oxidizing agent or agents, in place of or in excess of any anti-oxidants present, may detract from certain desirable qualities in rubber compounds. Accordingly, in some instances I have found it advantageous in fabricating rubber mold parts used in curing plastic resins, to surface the rubber part (say to a depth of $\frac{1}{100}$ to $\frac{1}{8}$ inch) with a rubber composition formulated as described with the oxidizing material, and to form the main body of the mold part of a normal anti-oxidant-containing rubber composition. Thus since only the immediate surface portions of the rubber in contact with the resin need be surfaced with the oxidizing rubber composition, generally speaking the remaining or body portion of the mold part may be otherwise formed or compounded, as desired, although for the bulk of the purposes for which these rubber mold parts are used, it is desirable that the part as a whole have flexible and resilient characteristics.

It is further desirable in the compounding of these mold parts that migratory and volatile plasticizers be eliminated, in order that the rubber in contact with the resin may retain the desired low hardness properties, improved heat aging qualities and the capacity for free and clean separation from the cured plastic resin surface. These qualities are imparted to the rubber by incorporating in it a substantial content (between about 2.5 to 30 parts based on the parts of synthetic rubber) of a silicone polymer or mixture thereof. Such modification of rubbers by the inclusion therein of silicone polymers constitutes the subject matter of my copending application, Serial No. 776,159, filed September 25, 1947, on "Rubber-Silicone Compounds and Their Manufacture," and the details of preparing such modified rubbers are more fully dealt with therein. For present purposes, the following description of synthetic rubbers of the class hereinabove designated, modified by the inclusion of silicone polymers, will suffice.

For purposes of the invention, the term "silicone polymer" includes polymerized organo-silicone compounds having a Si—O—Si skeleton structure with organic groups attached to the silicone atoms through Si linkages, such compounds being of open chain formation (with or without closed side or end chain) or of cylic structure with or without methyl group substitution as by multiple carbon alkyl or aryl radicals. Being of open chain or cyclic structure, such compounds do not undergo intermolecular polymerization and hence retain their liquid form and stability despite heating.

Particularly good results have been accomplished with silicone polymers preponderately of the open chain di-methylsiloxanes with trimethylsiloxy end groups and having the general formula:

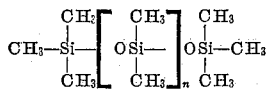

where "n" may be any number from one to a very large number. A range of polymer lengths from "n"=4, having an approximate molecular weight of 310.44, up to high polymers having approximate molecular weight of 26,400 (e. g. in the Dow-Corning "D-C" silicone fluid types "500" and "200," having viscosities from 1.5 to 1000 centistokes at 25° C.) have been used. It appears that a mixture of chain lengths is desirable, favoring cross linkage and condensation of the silicone polymer chains in the compounded rubber composition, to give a rubber-silcone composition maximum oil resistance.

It is understood that some groups in the silicone compounds contemplated for the purposes of the invention, may have hydroxyl terminations, at least during intermediate stages in the silicone polymerization. This temporary end grouping of course favors the reactivity of the compounds. Present in the higher polymers, either originally or as a result of chain condensation, may be unblocked polymer chains which aid the process of chain linking in the compounded rubber.

As illustrative of the cyclic silicone polymers, I may use cyclic dimethylsiloxane polymers of the general formula [(CH₃)₂SiO]x, where "x" may be a number ranging, for example, from 3 to 8, inclusive. These can be prepared by the depolymerization and subsequent regrouping of dimethylsiloxane high polymers under conditions of heat, alkalinity or catalysis, as by iron oxide or other metal oxides, according to the conditions existing in compounding of the rubber formulas herein disclosed, so that the presence of these cyclic forms may be contemplated. The cyclic dimethylsiloxane polymers are reactive by nature, and consequently aid in the cross linking processes.

It is further observed that other alkyl or aryl radicals may be substituted for the methyl groups for such purposes as to have a modifying effect on the physical characteristics of the polymerization product, and particularly for the purposes of the invention, to afford better dispersion qualities in compounding of the rubber formulae, and corresponding improvement of the finished product.

For certain purposes it has been found beneficial to use silicone polymers preponderately of the open chain di-hydrocarbon substituted siloxanes having tri-hydrocarbon substituted end groups and having the following general formula, where "R" as a symbol for hydrocarbon substituted radicals, may represent either methyl or phenyl substitutes in approximately equal proportions:

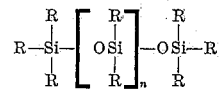

In preparing the silicon modified rubber, I may first disperse the silicone polymer on a filler, preferably one having a particular or bond affinity for the silicone. Such affinity is found to exist between the silicone polymers and silicate radicals, present for example in the alkaline earth metal silicates, preferably calcium silicate, and also finely divided silica. The silicone polymer may be mixed with the silicate filler by ball milling to effect an intimate and uniform dispersion by reason of the affinity of the silicone polymer for the silica or silicate. The ratio of silicone polymer to silicate or silica may vary depending upon such considerations as the amount of filler to be desired in the rubber, and the amount of silicone polymer to be added in any given instance. This dispersion is then readily incorporated with the elastomer by intermixing in the usual rubber mills, together with other additives to be incorporated in the final product. Other methods of compounding the elastomer and silicone polymer are discussed in the copending application to which I have referred.

Considering generally again the composition of the plastic resin-contacting rubber portions or surfaces of the mold part, the desired oxidizing potential may be given the rubber by incorporating in it between about 0.5 to 10 parts of any of the abovementioned oxidizing agent or agents, or their available oxygen equivalencies. It may be desirable to utilize sufficient amounts of the oxidizing agent to take advantage also of its qualities as a plasticizer and a cure activator, particularly with respect to polychloroprene. Pigment such as zinc oxide, calcium silicate, clays and magnesium oxide (particularly in polychloroprene rubbers) may be added in the range of about 25 to 75 parts per 100 parts of the rubber, to give tear resistance and desirable curing properties. For the purpose of effecting the cure of the named synthetic rubbers, with the exception of polychlorprene, I may use about 1.5 to 2.5 parts of any of the well-known and generally used sulfur-containing curing agents. In the case of polychloroprene, a corresponding quantity of zinc oxide may be used as the curing agent. Typical sulfur-containing curing agents are benzothiazyl disulfide and tetramethyl thiuram disulfide. And as previously indicated, the silicon polymer may be present in an amount between about 2.5 to 30 parts.

It will be understood that where the mold part is to be given any particular physical characteristics, such as pneumatic compressibility to a degree, the rubber composition may be made accordingly. Thus the rubber can be made cellular or it may contain cellular materials such as granulated cork.

The following are typical examples of rubber mold part or surface compositions to be used in direct contact with plastic resins undergoing thermal shaping and curing at the usual temperature conditions, both of these compositions being characterized by their oxidizing potential and the above discussed properties imparted to them by the presence of silicone polymers.

Example 1

| | Parts |
|---|---|
| Neoprene | 100 |
| Dimethyl diphenyl-siloxane copolymer | 20 |
| Silicon oxide | 20 |
| Zinc oxide | 20 |
| Hard clay | 30 |
| Magnesium oxide | 4 |
| Zinc stearate | 5 |
| Blue coloring | 0.20 |
| Benzoyl peroxide | 5 |

Example 2

| | Parts |
|---|---|
| Butadiene acrylonitrile copolymer | 100 |
| Dimethyl diphenyl siloxane copolymer | 20 |
| Silicon oxide | 20 |
| Zinc oxide | 20 |
| Hard clay | 30 |
| Zinc stearate | 5 |
| Blue coloring | 0.20 |
| Benzoyl peroxide | 5 |
| Surfur-containing curing compound | 2.0 |

The following examples typify oxidized rubber compositions lacking the silicone polymer.

Example 3

| | Parts |
|---|---|
| Polychloroprene | 100 |
| Silica | 25 |
| Zinc oxide | 5 |
| Magnesium oxide | 4 |
| Stearic acid | .50 |
| Benzoyl peroxide | 10 |

Example 4

| | Parts |
|---|---|
| Butadiene, 65% | 100 |
| Acrylonitrile, 35% | |
| Polyvinyl chloride | 50 |
| Silicia | 50 |
| Zinc oxide | 5 |
| Stearic oxide | .50 |
| Benzoyl peroxide | 10 |
| Tetramethyl thiuram disulfide | 2.50 |

I claim:

1. The method of forming and curing a thermally setting polyester resinous plastic composition the curing of which is inhibited in the presence of rubber anti-oxidants, that includes contacting a heated body of said plastic composition during its curing with a molding material comprising a vulcanized rubber of the class consisting of polychloroprene, butadiene-acrylonitrile copolymers, butadiene-styrene copolymers and chlorinated copolymers of butadiene and acrylonitrile, said vulcanized rubber containing an oxidizing agent uniformly distributed within the rubber and imparting oxidizing properties to said material at the mold-plastic composition interface.

2. The method of forming and curing a thermally setting polyester resinous plastic composition the curing of which is inhibited in the presence of rubber anti-oxidants, that includes contacting a heated body of said plastic composition during its curing with a molding material comprising a vulcanized rubber of the class consisting of polychloroprene, butadiene-acrylonitrile copolymers, butadiene-styrene copolymers and chlorinated copolymers of butadiene and acrylonitrile, said vulcanized rubber containing a peroxide uniformly distributed within the rubber and oxidizing agent uniformly distributed within the rubber and imparting oxidizing properties to said material at the mold-plastic composition interface.

3. The method of forming and curing a thermally setting polyester resinous plastic composition the curing of which is inhibited in the presence of rubber anti-oxidants, that includes contacting a heated body of said plastic composition during its curing with a molding material comprising a vulcanized rubber of the class consisting of polychloroprene, butadiene-acrylonitrile copolymers, butadiene-styrene copolymers and chlorinated copolymers of butadiene and acrylonitrile, said vulcanized rubber containing benzoyl peroxide uniformly distributed within the rubber and imparting oxidizing properties to said material at the mold-plastic composition interface.

4. The method of forming and curing a thermally setting polyester resinous plastic composition the curing of which is inhibited in the presence of rubber anti-oxidants, that includes contacting a heated body of said plastic composition during its curing with a molding material comprising a vulcanized rubber of the class consisting of polychloroprene, butadiene-acrylonitrile copolymers, butadiene-styrene copolymers and chlorinated copolymers of butadiene and acrylonitrile, said rubber containing a uniform dispersion throughout the rubber of a thermally stable liquid polymer of a dihydrocarbon substituted siloxane in which the substituent groups are of the class consisting of alkyl and aryl groups, said rubber containing also an oxidizing agent uniformly distributed within the rubber and imparting oxidizing properties to said material at the mold-plastic composition interface.

5. The method of forming and curing a thermally setting polyester resinous plastic composition the curing of which is inhibited in the presence of rubber anti-oxidants, that includes contacting a heated body of said plastic composition during its curing with a molding material comprising a vulcanized rubber of the class consisting of polychloroprene, butadiene-acrylonitrile copolymers, butadiene-styrene copolymers and chlorinated copolymers of butadiene and acrylonitrile, said rubber containing a uniform dispersion throughout the rubber of between about 2.5 to 30 parts of a thermally stable liquid polymer of a dihydrocarbon substituted siloxane in which the substituent groups are of the class consisting of alkyl and aryl groups, said rubber containing also an oxidizing agent uniformly distributed within the rubber and imparting oxidizing properties to said material at the mold-plastic composition interface.

References Cited in the file of this patent

UNITED STATES PATENTS

| 1,956,965 | Strickhouser | May 1, 1934 |
| 2,454,457 | Joannides | Nov. 23, 1948 |
| 2,470,772 | Haas | May 24, 1949 |
| 2,478,165 | Collins | Aug. 2, 1949 |
| 2,586,211 | Currie | Feb. 19, 1952 |

FOREIGN PATENTS

| 474,242 | Great Britain | Oct. 27, 1937 |
| 627,560 | Great Britain | Aug. 11, 1949 |

OTHER REFERENCES

Allen: India Rubber-World, August 1949, pages 577–581, 586.

Sturgis et al.: Ind. & Eng. Chem., June 1947, vol. 39, page 64.

Warden: India Rubber World, December 1947, pages 309–311, 317.